April 8, 1958 M. M. ESS Re. 24,453

TABLE CONNECTING LEAF

Original Filed June 10, 1954

Merlin M. Ess
INVENTOR.

BY Thomas A. O'Brien and Harvey R. Jackson
Attorneys

United States Patent Office

Re. 24,453
Reissued Apr. 8, 1958

24,453

TABLE CONNECTING LEAF

Merlin M. Ess, Clyde, Ohio, assignor to W. H. Metz, Incorporated, Clyde, Ohio, a corporation of Ohio Original No. 2,737,430, dated March 6, 1956, Serial No. 435,885, June 10, 1954. Application for reissue March 1, 1957, Serial No. 643,487

3 Claims. (Cl. 311—4)

Matter enclosed in heavy brackets [ ] appears in the original patent but forms no part of this reissue specification; matter printed in italics indicates the additions made by reissue.

The present invention relates generally to new and useful improvements in tables for use particularly in restraurants, and has for its primary object to provide, in a manner as hereinafter set forth, novel means whereby two or more conventional tables may be expeditiously and detachably connected to serve as a unit with no loss or reduction of seating capacity.

Another very important object of the invention is to provide, in a leaf in the form of a board of panel adapted to be mounted between a pair of tables to be connected, novel means for ataching said board of panel to said tables.

Other objects of the invention are to provide a table connecting leaf of the aforementioned character which will be comparatively simple in construction, strong, durable, compact, light in weight, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
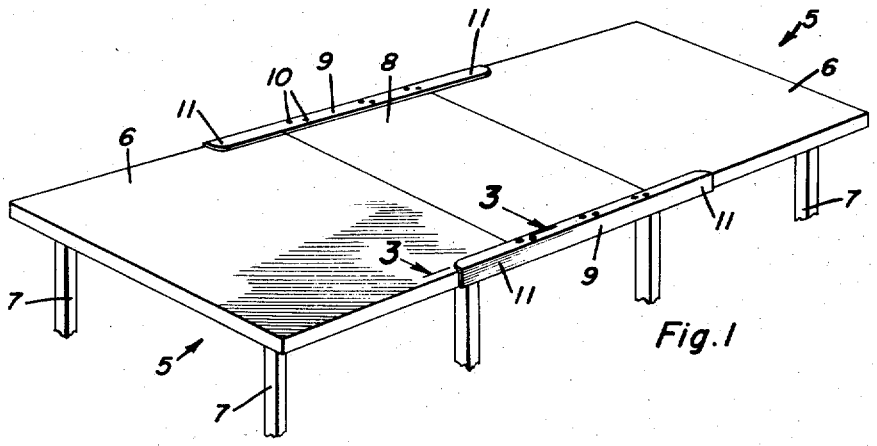
Figure 1 is a perspective view, showing a pair of tables connected by a leaf constructed in accordance with the present invention.
Figure 2:
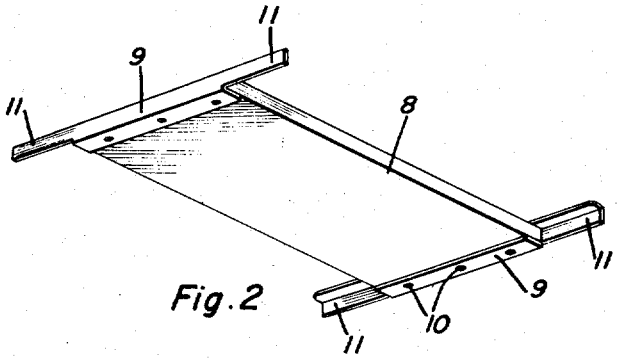
Figure 2 is a bottom perspective view of the invention.

Referring now to the drawing in detail, and to Figure 1 thereof in particular, it will be seen that reference character 5 designates a pair of conventional restaurant tables, each of which has a capacity of four persons. The tables 5 include the usual tops 6 provided with suitable supporting legs 7.

The embodiment of the present invention which has been illustrated comprises a leaf 8 in the form of an elongated panel or board of suitable dimensions and material. The board or panel 8 is preferably finished to blend or harmonize with the table tops 6.

Figure 3:
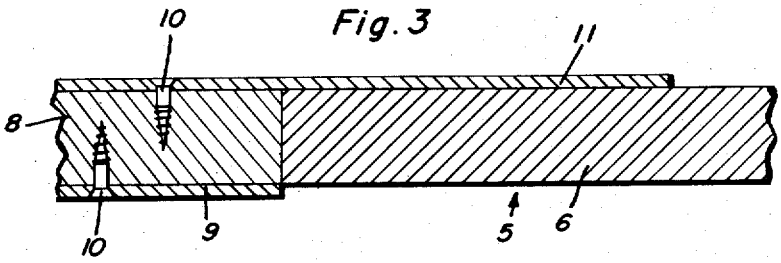
Figure 3 is a fragmentary view in section, taken substantially on the line 3—3 of Figure 1.

As shown to advantage in Figure 1 of the drawings, the leaf 8 is adapted to be mounted between the table tops 6 in a manner to be flush therewith. Toward this end, the leaf 8 has fixed transversely on its end portions a pair of channel members 9 of suitable metal. The channel members 9 may be firmly secured on the end portions of the leaf 8 in any desired manner, as, for instance, through the medium of countersunk screws 10 (see Figure 3). The metallic channel members 9 terminate in angle iron end portions 11 which project beyond the longitudinal edges of the leaf 8 and which are adapted to receive and rest on the adjacent corner portions of the table tops 6.

It is thought that the use of the device will be readily apparent from a consideration of the foregoing. Briefly, the tables 5 are positioned in spaced relation for the reception of the leaf 8 therebetween. The angle iron end portions or brackets 11 are brought to rest on the adjacent corner portions of the table tops 6 for firmly supporting the leaf 8 therebetween. It is to be noted that the construction and arrangement is such as to facilitate sliding the table tops 6 toward or away from each other in the angle irons 11 which function as guides to facilitate assembling or disassembling the unit.

It is believed that the many advantages of a table leaf constructed in accordance with the present invention will be readily understood and although a preferred embodiment of the device is as illustrated and described, it is to be understood that changes in the details of construction may be resorted to which will fall within the scope of the invention as claimed.

What is claimed is:

1. A table leaf of the character described comprising: a board adapted to be mounted between a pair of spaced table tops, channel members fixed transversely on the end portions of said board, said channel members terminating in angle iron end portions projecting laterally beyond the longitudinal edges of the board for the reception of the adjacent corner portions of the table tops and engageable with the upper surfaces and the edges thereof for supporting the board therebetween against relative longitudinal movement.

2. A table leaf of the character described comprising: an elongated panel adapted to be mounted between a pair of spaced table tops, metallic channel members positively secured transversely to the end portions of said panel, and angle iron extensions integral with the ends of the channel members and projecting longitudinally therefrom and adapted to receive and rest on the adjacent corner portions of the table tops for supporting the panel therebetween substantially flush therewith, said extensions further being engageable with the edges of the table tops for positively retaining the panel and said tops against relative longitudinal movement.

*3. A table leaf, comprising a panel adapted to be mounted between two spaced table tops, two pairs of end elements carried by said panel, one pair at each end thereof, the end elements of each pair projecting laterally in opposite directions from an end of the panel and having generally flat portions adapted to rest upon the upper corner surfaces of the two spaced table tops, with the consequent support of the panel between the two table tops, and also having depending portions for cooperation with the adjacent end edges of the two spaced table tops, with the consequent prevention of endwise movement of the panel relative to said table tops.*

References Cited in the file of this patent or the original patent

UNITED STATES PATENTS

| | | |
|---|---|---|
| 158,336 | Tiemann | Dec. 29, 1874 |
| 696,044 | Hoffmann | Mar. 25, 1902 |
| 1,520,518 | Thomason | Dec. 23, 1924 |
| 2,031,398 | Wagoner | Feb. 18, 1936 |
| 2,461,157 | Holden | Feb. 8, 1949 |
| 2,489,933 | Schwarz | Nov. 29, 1949 |
| 2,503,602 | Titley | Apr. 11, 1950 |
| 2,533,147 | Sparks | Dec. 5, 1950 |
| 2,647,811 | Norris | Aug. 4, 1953 |

FOREIGN PATENTS

| | | |
|---|---|---|
| 86,663 | Austria | Dec. 10, 1921 |